United States Patent
Björklund (10) Patent No.: US 7,715,874 B2
(45) Date of Patent: May 11, 2010

(54) PORTABLE HANDSFREE DEVICE FOR CABLE CONNECTION TO A MOBILE TERMINAL

(75) Inventor: Staffan Carl Gösta Björklund, Eslöv (SE)

(73) Assignee: Sony Ericsson Mobile Communications AB, Lund (SE)

( * ) Notice: Subject to any disclaimer, the term of this patent is extended or adjusted under 35 U.S.C. 154(b) by 554 days.

(21) Appl. No.: 11/669,962

(22) Filed: Feb. 1, 2007

(65) Prior Publication Data

US 2008/0188270 A1 Aug. 7, 2008

(51) Int. Cl.
*H04B 1/16* (2006.01)
*H04M 1/00* (2006.01)

(52) U.S. Cl. .................. 455/557; 455/569.1

(58) Field of Classification Search .......... 455/556.1, 455/556.2, 557, 558, 559
See application file for complete search history.

(56) References Cited

U.S. PATENT DOCUMENTS

| | | | |
|---|---|---|---|
| 7,529,566 B2* | 5/2009 | Rodman et al. | 455/569.1 |
| 2002/0107046 A1* | 8/2002 | Davis | 455/557 |
| 2003/0104835 A1* | 6/2003 | Douhet | 455/557 |
| 2003/0207703 A1* | 11/2003 | Liou et al. | 455/575.2 |
| 2005/0070225 A1* | 3/2005 | Lee | 455/41.3 |
| 2005/0085278 A1 | 4/2005 | Lin | |
| 2007/0010298 A1 | 1/2007 | Chang | |
| 2007/0026908 A1* | 2/2007 | Chen | 455/575.2 |
| 2008/0108386 A1* | 5/2008 | Hard | 455/557 |
| 2008/0152160 A1* | 6/2008 | Chew et al. | 381/71.6 |

FOREIGN PATENT DOCUMENTS

DE 20 2006 005 263 U1 9/2006
WO 2007/024566 3/2007

OTHER PUBLICATIONS

Dr. Vladimir Minenko; "Datenkabel mit einem Headset-Anschluss für mobile Datengeräte", IP.Com Journal, IP. Com Inc., West Henrietta, New York, Jul. 25, 2003, XP013010988, ISSN: 1533-0001.
International Search Report and Written Opinion for corresponding Application No. PCT/EP2008/050775 mailed May 21, 2008.

* cited by examiner

*Primary Examiner*—Blane J Jackson
(74) *Attorney, Agent, or Firm*—Renner, Otto, Boisselle & Sklar, LLP (57) ABSTRACT

A portable handsfree for cable-connection to a mobile terminal is provided. The portable handsfree comprises a cable for connecting the portable handsfree to a mobile telephone at a first end of the portable handsfree and to a computer at another end of the portable handsfree such that data transmission between the mobile terminal and the computer can be enabled through the portable handsfree.

8 Claims, 6 Drawing Sheets

PORTABLE HANDSFREE DEVICE FOR CABLE CONNECTION TO A MOBILE TERMINAL

TECHNICAL FIELD

The present invention relates to portable handsfrees and, more particularly, to portable handsfrees suitable for cable-connection to mobile terminals such as mobile telephones.

BACKGROUND

Electronic devices such as mobile telephones including wireless communication transceivers typically include both a user input interface in the form of keys or buttons, and a user output interface in the form of one or more displays. Audio interfaces are normally also included by means of speakers and microphones. In terms of traditional telephony services, user input keys are typically used for setting up calls, whereas the microphone and the speaker are used for standard speech communication.

In recent years, mobile telephones have become much more than pure speech communication devices. Fast development and miniaturization in battery technology and electronic components, as well as the breakthrough of small high resolution color displays, has lead to compact radio communication terminals more and more taking the form of media terminals. Many mobile telephones of today are capable of receiving FM radio, and comprise digital media players for playing music. Digital video may also be stored and presented on the display of some types of terminals. It is generally possible for a user to access locally stored media items through playlists including stored media items, or to access radio channels through radio station playlists. It is also possible to create personal playlists of e.g. locally stored music tracks, such as a playlist including a number of specifically selected songs, or a playlist with a predefined set of music tracks collected from a certain artist or representing a certain style or genre. Activation of that playlist will then trigger the media player to play the items defined in the list, either in the playlist order or in random order. Activation of an FM radio channel in a radio playlist will set a tuner to the frequency of that channel and play it in real time without storing. The played items are presented on the user output of the terminal, i.e. on the display in the case of video, or through a speaker or earpiece speaker in the case of audio.

Figure 1:
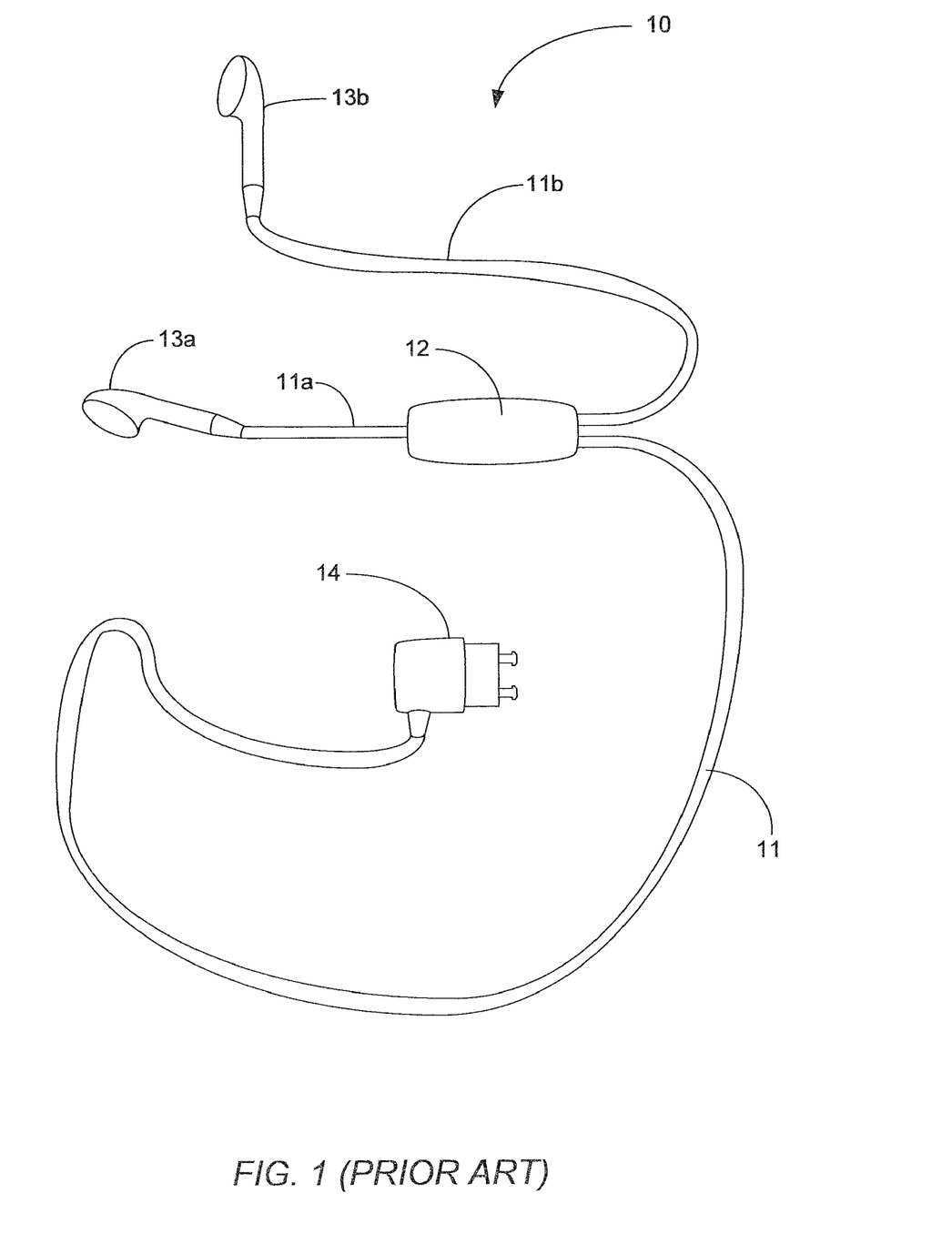
FIG. 1 is a perspective view of a prior art Stereo Portable Handsfree such as SONY ERICSSON HPM-70.

Mobile telephones are known to operate with portable handsfrees or headsets which may be plugged into the handset of the mobile telephone to provide a handsfree talking facility. Historically, the portable handsfrees for mobile telephones were limited to voice communication. However, due to the fact that mobile telephones are more and more taking the form of media terminals as described hereinabove, recent portable handsfrees have been developed to also be operable to present music to the user through a speaker or earpiece speaker of the portable handsfree. As one example of this, the SONY ERICSSON W810i mobile telephone available from Sony Ericsson Mobile Communications may operate using a SONY ERICSSON HPM-70 Stereo Portable Handsfree. A portable handsfree 10 is schematically shown in FIG. 1, and includes a portable handsfree cable 11. The handsfree cable 11 comprises an in-line microphone portion 12. As is illustrated in FIG. 1, the handsfree cable 11 may be branched-off, at the microphone portion 12, into two separate end portions 11a, 11b. In the outer end of each of these two end portions 11a, 11b there are provided earpiece speakers 13a, 13b. Furthermore, the portable handsfree 10 may comprise a clip (not shown) or the like for securing the handsfree 10 to an item of clothing. Finally, the handsfree cable 11 also comprises a connector 14 for plugging into a jack on a mobile telephone (not shown).

The inventor of the present invention has realized that current music players, e.g. MP3 players such as the iPod shuffle available from APPLE COMPUTER have an advantage over current mobile telephones in that they may be plugged directly into a personal computer. Thus, it is easy for users of iPod shuffles to import music from other peoples' personal computers and use their iPod shuffles as portable "hard disks" without bringing a separate cable or the like. As of today, to do this with currently available mobile telephones, e.g. the SONY ERICSSON W810i mobile telephone available from Sony Ericsson Mobile Communications, the user may need to bring a separate cable which is dedicated for connection and data transmission between the mobile telephone and the personal computer only. However, this may be annoying to the user if the user wishes to bring around as few articles as possible. Alternatively, if the personal computer supports the same memory stick, e.g. MS duo or M2, as the mobile telephone in question, music can be shared by users by interchanging music from each others' memory stick. However, when interchanging memory sticks between mobile telephones and personal computers there may be a risk that the memory stick can be lost or damaged. Therefore, the inventor of the present invention has realized that there is a need for an alternative means or way of connecting a mobile telephone to a personal computer to enable data transmission therebetween, such that the one or more of the disadvantages or deficiencies described above are at least partly mitigated, alleviated or eliminated.

SUMMARY OF THE INVENTION

According to some embodiments of the invention, a portable handsfree for cable-connection to a mobile terminal comprises a cable for connecting the portable handsfree to a mobile terminal at a first end of the portable handsfree and to a computer at another end of the portable handsfree such that data transmission between the mobile terminal and the computer can be enabled through said portable handsfree.

The portable handsfree may be a stereo headset.

The mobile terminal may be a portable radio communication equipment, a mobile radio terminal, a mobile telephone, a cellular telephone, a pager, a communicator, an electronic organizer, a smart phone, a media player, a music player, etcetera.

The cable may be a USB cable having a USB connector for connection to a USB socket on the computer.

The portable handsfree may comprise a handsfree cable, which comprises:
  at one end of the handsfree cable a connector for connecting the portable handsfree to the mobile terminal,
  at an opposite end of the handsfree cable a speaker, and
  a casing positioned in-between the connector and the speaker, wherein the handsfree cable comprises the USB cable within the handsfree cable and wherein the USB connector is provided within the casing.

The handsfree cable may comprise:
  a first cable portion comprising at one end the connector for connecting the portable handsfree to the mobile terminal and at an opposite end a first casing portion; and a second cable portion comprising at one end the speaker and at an opposite end a second casing portion; wherein the first and second casing portions are detachably arranged to each other in a male-female connection to form the casing; and wherein the USB cable is incorporated within the first cable portion and the USB connector is incorporated within the first casing portion.

The casing may be a microphone portion of the portable handsfree.

Alternatively, the cable may be a FireWire cable having a FireWire connector for connection to a FireWire socket on the computer.

The portable handsfree may comprise a handsfree cable, which comprises:

at one end of the handsfree cable a connector for connecting the portable handsfree to the mobile terminal,
at an opposite end of the handsfree cable a speaker, and
a casing positioned in-between the connector and the speaker, wherein the handsfree cable comprises the FireWire cable within the handsfree cable and wherein the FireWire connector is provided within the casing.

The handsfree cable may comprise:

a first cable portion comprising at one end the connector for connecting the portable handsfree to the mobile terminal and at an opposite end a first casing portion; and a second cable portion comprising at one end the speaker and at an opposite end a second casing portion; wherein the first and second microphone portions are detachably arranged to each other in a male-female connection to form the casing; and wherein the FireWire cable is incorporated within the first cable portion and the FireWire connector is incorporated within the first casing portion.

The casing may be a microphone portion of the portable handsfree.

Some embodiments of the invention provide an improved portable handsfree which is capable of serving as a medium between a mobile terminal and a computer to enable data transmission therebetween. Thus, some embodiments of the invention provide a new function to portable handsfrees existing on the market.

It is an advantage of some embodiments of the invention that the improved portable handsfree enables data transmission between a mobile terminal and a computer. Thus, the user only has to bring his/her mobile terminal and the accompanying portable handsfree. This will often be the case, as the user normally uses the speakers of the portable handsfree when listening to music provided by the music player of the mobile terminal. There is, consequently, no longer a need for bringing a separate cable which is dedicated solely for the purpose of connecting and transmitting data between the mobile terminal and computer. Thus, as compared with the known prior art, this may mean that the user can bring around fewer articles. Further, there is no longer a need for bringing and interchanging memory sticks between a mobile terminal and a computer. Hence, the risk that the memory stick can be lost or damaged is reduced. Accordingly, as compared to the known prior art some embodiments of the invention provide improved means and ways of, e.g., sharing music files between a mobile terminal and a personal computer.

BRIEF DESCRIPTION OF THE DRAWINGS

Further objects, features and advantages of the invention will appear from the following detailed description of embodiments of the invention, wherein embodiments of the invention will be described in more detail with reference to the accompanying drawings, in which.

DETAILED DESCRIPTION OF EMBODIMENTS

The present description relates to the field of portable handsfrees which are suitable for cable-connection to mobile terminals including media players for presenting audio to a user. Such mobile terminals may be capable of accessing media items from different types of media sources including locally stored media files and received real time or streaming media signals. Such a mobile terminal typically comprises a display and an associated graphical user interface for presentation of information and images, or an output port for transmitting image data to an external display. The mobile terminal also typically comprises an audio output, e.g. at least one speaker and/or an output port for connecting an external speaker device or the portable handsfree according to the embodiments of the invention. The mobile terminal is typically also equipped with a user input interface, preferably comprising keys or buttons. It should be noted that the term key of the user input interface is to be interpreted broadly, as a means for a user to actively input a symbol or a command into the mobile terminal. A key may therefore be a mechanical button, ball or joystick which is operated by depression or movement. It may alternatively be a separate touch-sensitive area, or realized by making the display touch-sensitive, such that user input is detected upon touching the key in question. The user input interface may alternatively or additionally comprise software and an associated microprocessor system for handling voice commands uttered into a speaker of the mobile terminal.

A portable handsfree according to an embodiment of the present invention will be described more fully hereinafter with reference to the accompanying drawings. This embodiment of the invention is provided so that this disclosure will be thorough and complete, and will fully convey the scope of the invention to those skilled in the art. Like numbers refer to like elements throughout the drawings.

Figure 2:
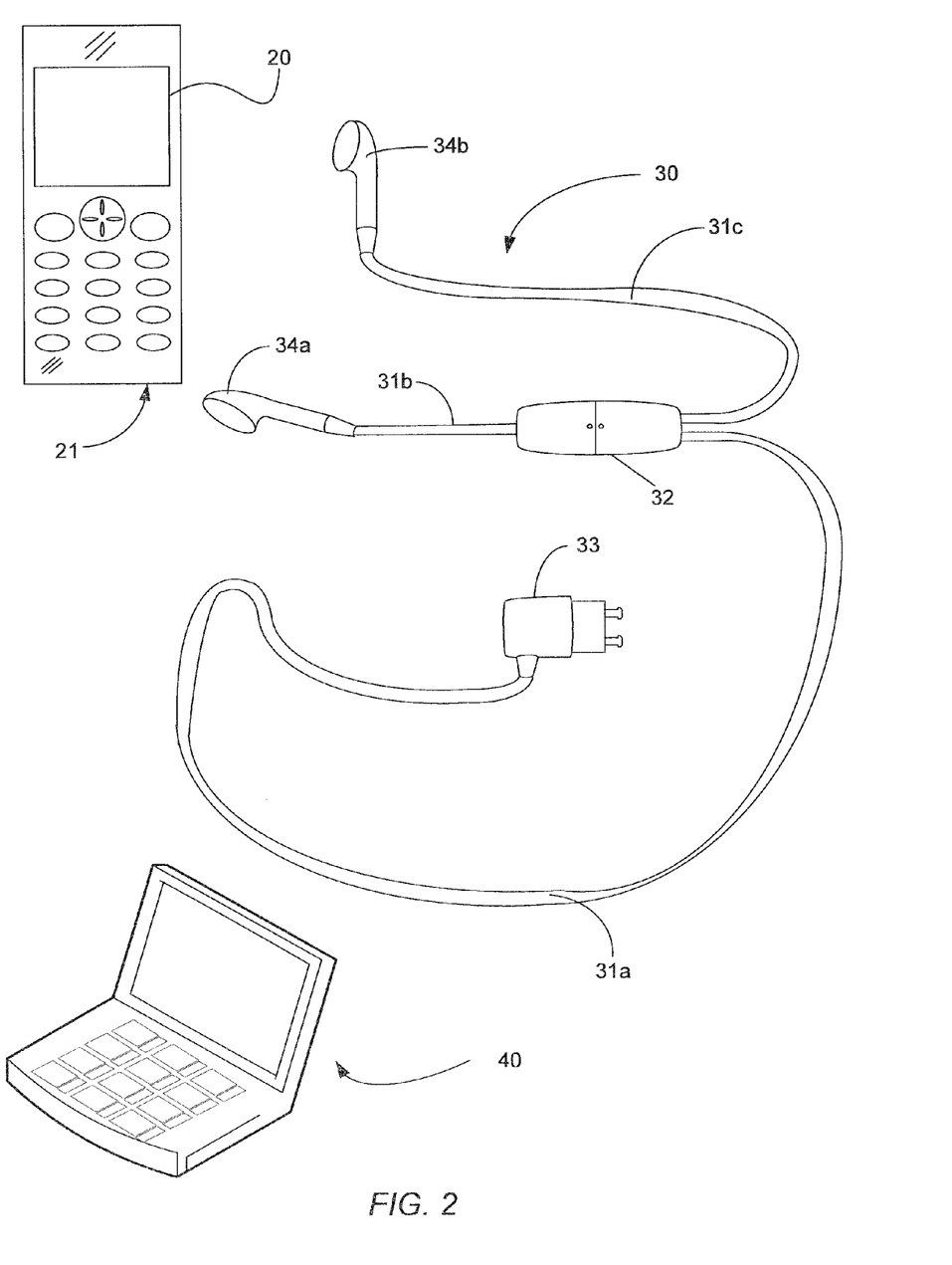
FIG. 2 is a perspective view of a portable handsfree according to an embodiment of the invention.
Figure 3:
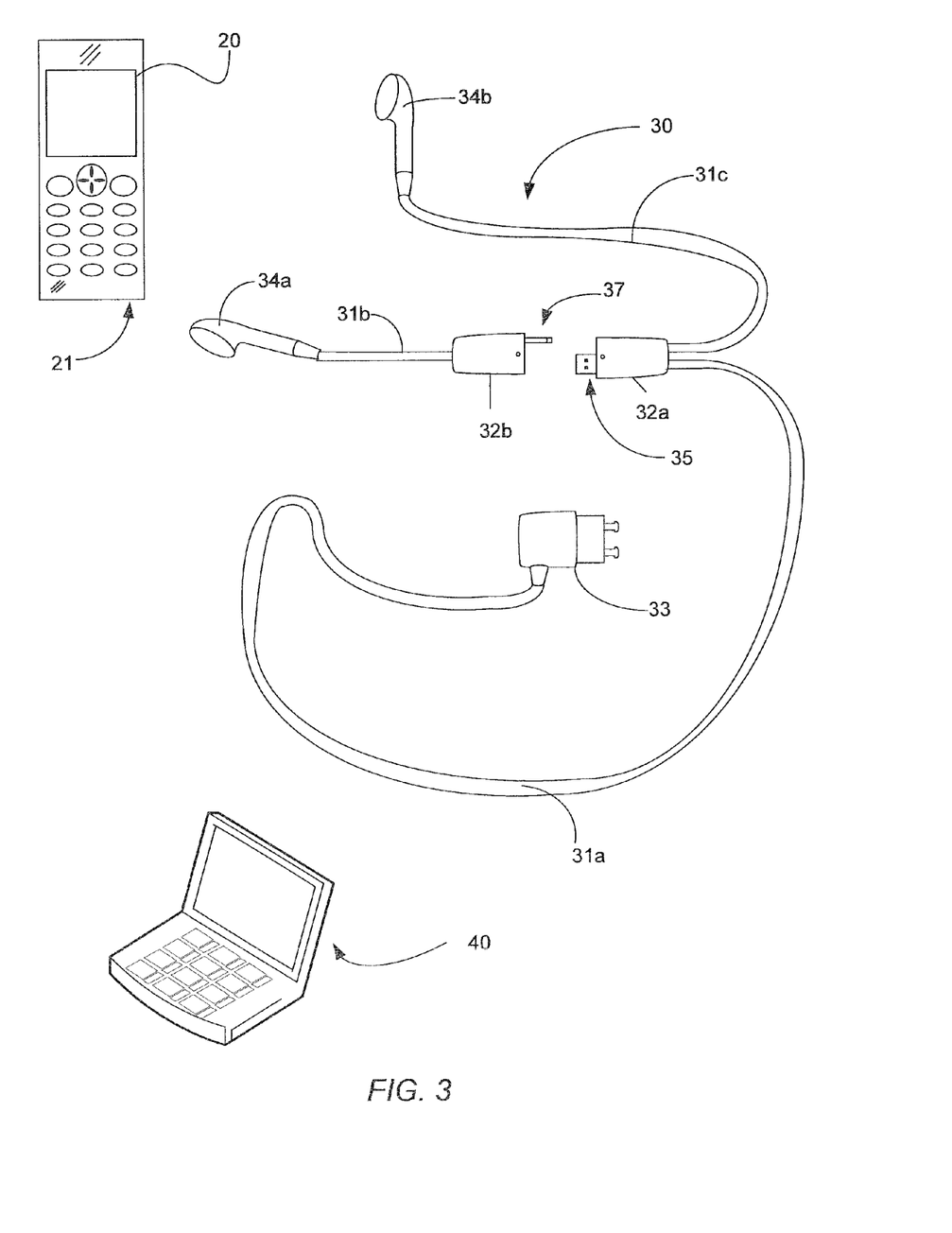
FIG. 3 is a perspective view of the portable handsfree of FIG. 2 when the cable portions of the portable handsfree are detached from each other.

FIGS. 2 and 3 illustrate a typical arena for an embodiment of the present invention, comprising a mobile terminal 20 which includes a media player. The media player may be a digital video player, but will now be described as being a digital audio player such as an mp3 player or the like. In FIGS. 2 and 3, the mobile terminal 20 is embodied as a mobile telephone. Reference will therefore be to a mobile telephone 20 in the following. This is only for illustrative purpose and should not be considered as limiting to the embodiments of the invention set forth herein. For example, the mobile terminal 20 could be portable radio communication equipment, a mobile radio terminal, a cellular telephone, a pager, a communicator, an electronic organizer, a smart phone, a media player such as a music player, etc. The functional structure or the actual function of mobile telephone 20 is not crucial to the invention, and will therefore not be described in detail herein, except for those functions which are relevant to the invention. Furthermore, the outer appearance of the mobile telephone 20 need not take the indicated shape of FIGS. 2 and 3. Instead the mobile telephone may e.g. be of a clamshell type, a jack knife type, or the like.

Further, FIGS. 2 and 3 illustrate a portable handsfree 30 according to an embodiment of the present invention. The portable handsfree includes a portable handsfree cable 31. The handsfree cable 31 comprises a first cable portion 31a, a second cable portion 31b and a third cable portion 31c. The portable handsfree cable 30 also comprises an in-line microphone portion 32. As can be seen in FIGS. 2 and 3, respectively, the in-line microphone portion 32 is arranged in-between the first, second and third cable portion 31a, 31b, 31c. Furthermore, the portable handsfree 30 may comprise a clip (not shown) or the like for securing the handsfree 30 to an item of clothing carried by the user.

At a first end of the first cable portion 31a, there is provided a connector 33 for plugging into a jack or socket 21 on the mobile telephone 20. Thus, the portable handsfree 30 is connectable to the mobile telephone 20. An opposite second end of the first cable portion 31a is connected to a first portion 32a of the microphone 32. At a first end of the second cable portion 31b, the second cable portion 31b is connected to a second portion 32b of the microphone 32. An opposite second end of the second cable portion 32 comprises a speaker 34a. Further, at a first end of the third cable portion 31c, the third cable portion 31c is connected to the first portion 32a of the microphone 32. An opposite third end of the third cable portion 32 comprises another speaker 34b. Thus, in the preferred and disclosed embodiment, the portable handsfree 30 comprises two ear-piece speakers 34a, 34b. The two ear-piece speakers 34a, 34b are intended for the respective ears of the user.

Figure 4A:
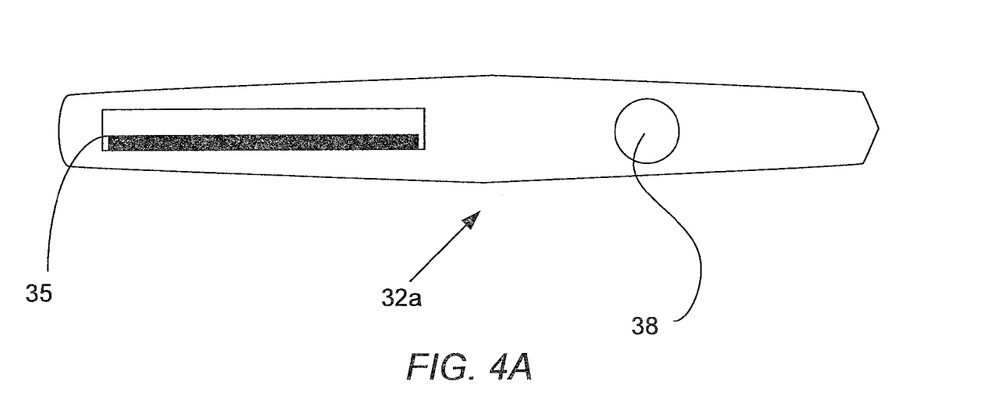
FIG. 4a is a detailed view of a first microphone portion of the portable handsfree of FIGS. 2 and 3.

As is illustrated in FIGS. 2 and 3, the microphone 32 comprises two detachably mounted microphone portions 32a, 32b, hereinafter referred to as the first microphone portion 32a and the second microphone portion 32b, respectively. These microphone portions 32a and 32b are also illustrated in more detail in FIGS. 4a and 4b, respectively. As can be seen in FIG. 3, the cable portions 31a, 31b, and 31c can be detachably connected to each other via the microphone portion 32. In the preferred and disclosed embodiment, the first cable portion 31a comprises a USB cable incorporated within the first cable portion 31a. The USB cable of the handsfree cable 31 is connectable to the mobile telephone 20 through the connector 33 of the handsfree cable 31. The USB cable further comprises a USB connector or plug 35 for connection to a corresponding USB jack or socket of a computer 40, e.g. a personal computer (PC). As is illustrated in FIG. 3, the first microphone portion 32a comprises the USB connector 35. Consequently, the first cable portion 31a of the handsfree cable 31 is connectable to a computer 40 through the USB connector 35. When the first cable portion 31a is connected to the mobile telephone 20 at one end and to the computer 40 at the other end via the USB connector 35, the USB cable provides for a computer interface to enable data transmission between the mobile telephone 20 and the personal computer 40. On the other hand, when the microphone portions 32a, 32b are connected to each other as illustrated in FIG. 2, the USB connector 35 of the first microphone portion 32a may rest in a corresponding recess 36 of the upper microphone portion 32b. Thus, in this position the USB connector 35 and the recess 36 form a male-female connection. Accordingly, in this position the microphone portion 32 also serves as a casing for encasing the USB connector 35.

Figure 4B:
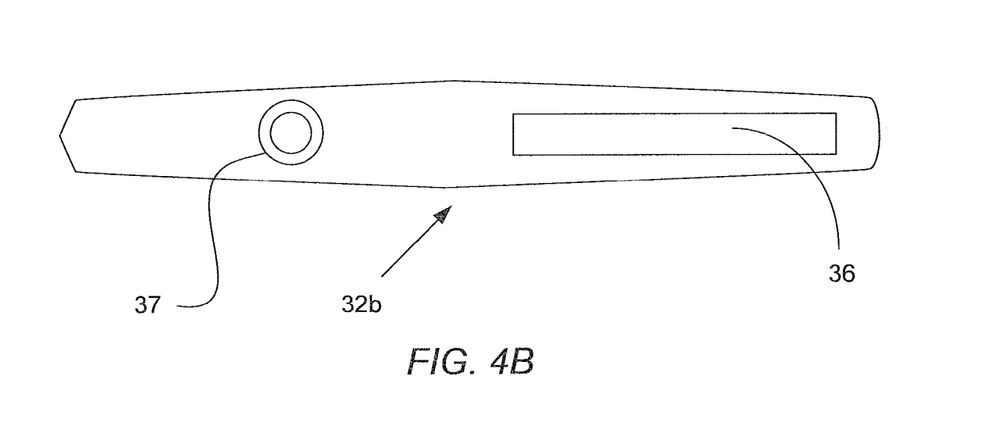
FIG. 4b is a detailed view of a second microphone portion of the portable handsfree of FIGS. 2 and 3.

In the preferred and disclosed embodiment, the second microphone portion 32b comprises a plug 37, e.g. a 3.5 mm plug. The stereo plug 37 can be inserted into a corresponding recess 38 of the lower microphone portion 32a, such that a male-female connection is formed. In this position, the portable handsfree 30 can serve as a general portable handsfree well-known in the art.

Figure 5:
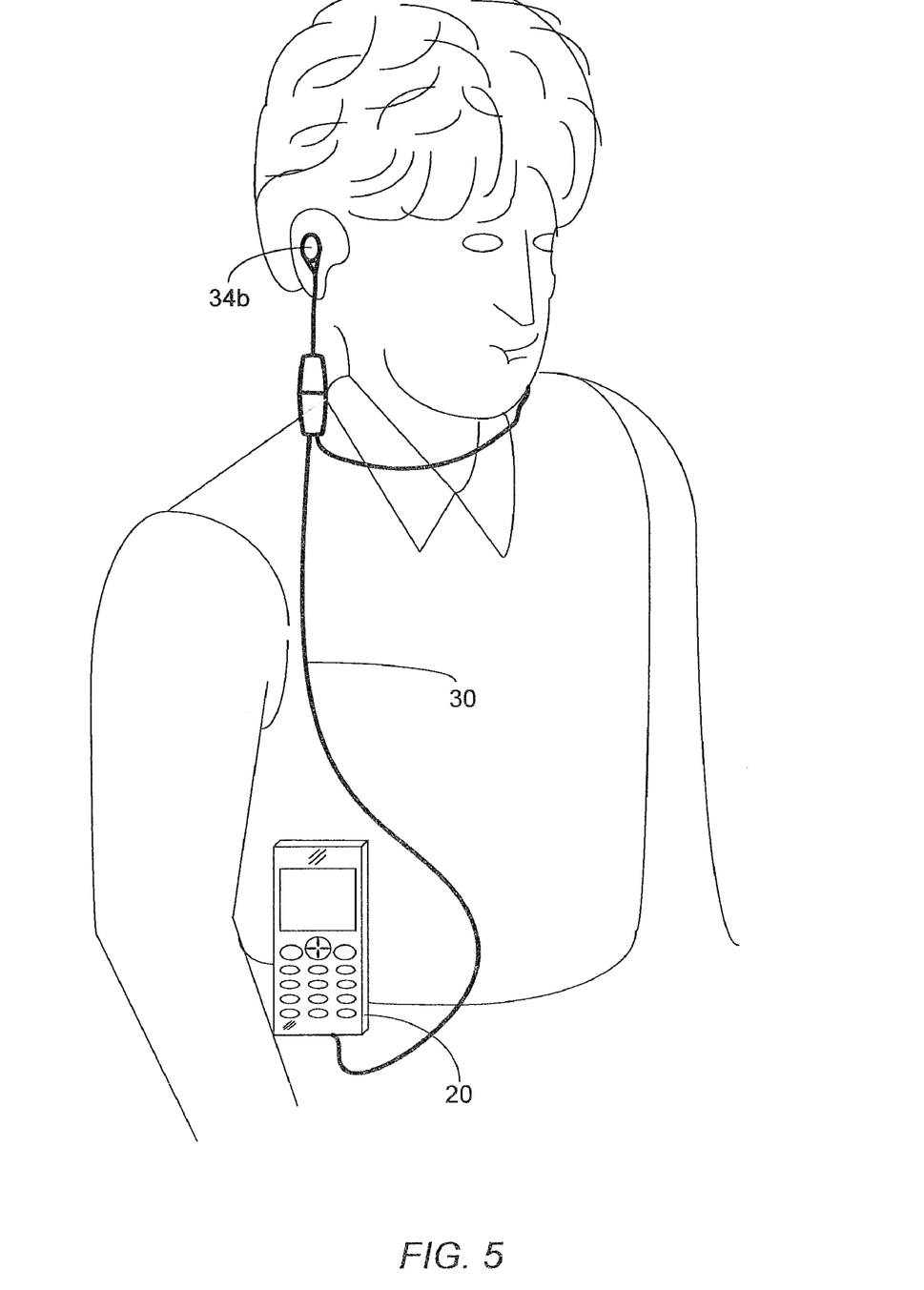
FIG. 5 shows one example of use of the portable handsfree of FIGS. 2-4.
Figure 6:
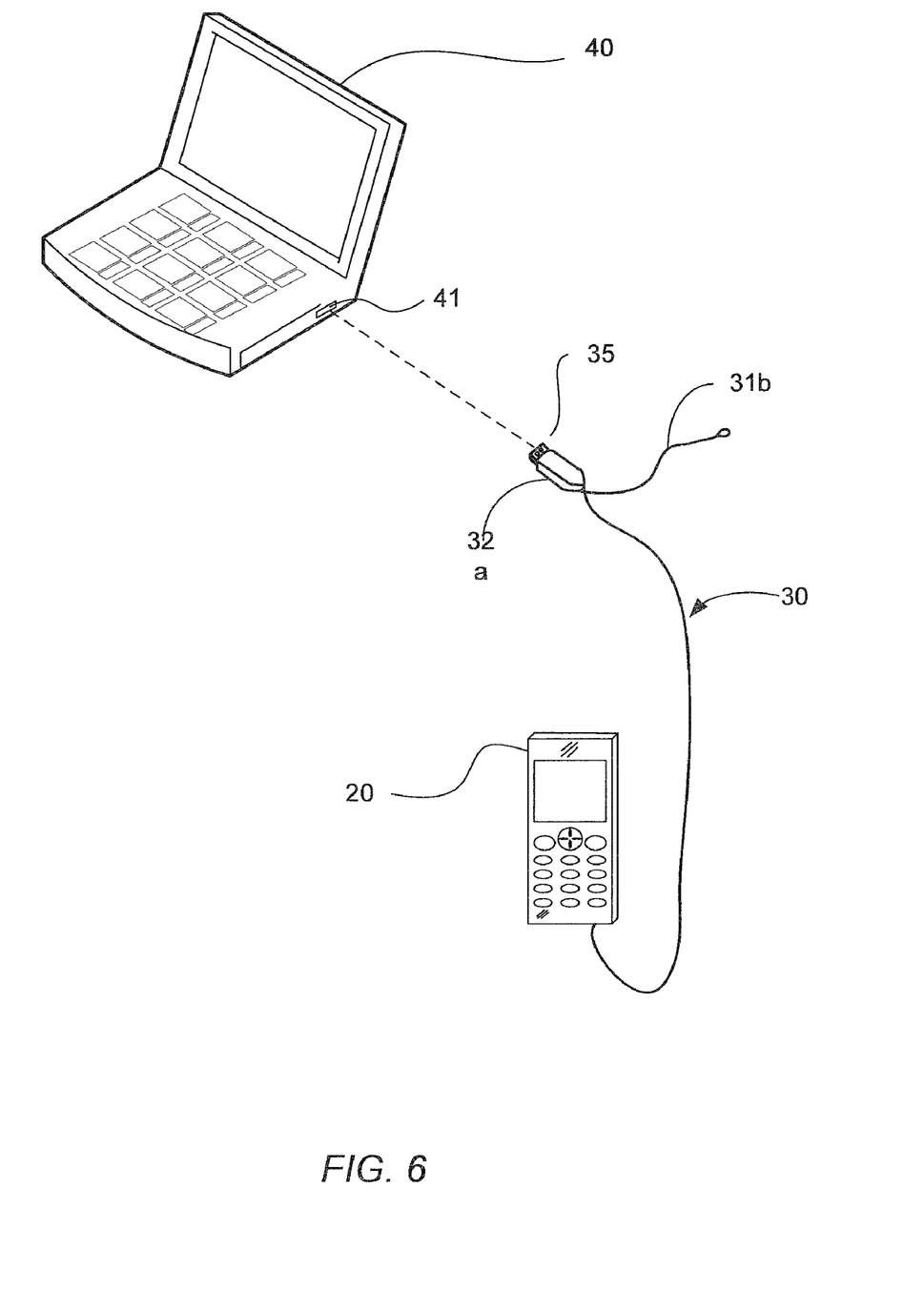
FIG. 6 shows another example of use of the portable handsfree of FIGS. 2-4.

FIGS. 5 and 6 show two examples of use of the portable handsfree 30 described in conjunction with FIGS. 2-4. In FIG. 5, the portable handsfree 30 is carried by a user such that the two ear-piece speakers of the portable handsfree are positioned in the respective ears of the user. In this position, the portable handsfree 30 may serve as a general portable handsfree to transmit and receive voice signals to and from a mobile telephone 20. Alternatively, the portable handsfree 30 may serve as a general portable handsfree to listen to music or the like played by a music player of the mobile telephone 20. In FIG. 6, on the other hand, the portable handsfree 30 is connected at the USB connector 35 to a USB socket 41 on a computer 40 and serves to transmit data between the mobile telephone 20 and the computer 40. For example, data stored in the mobile phone 20, e.g. digital photos, short messages, music files etc., can be transmitted to the computer 40 for storage therein, or to download data stored in the computer 40, such as music files, ringing types for incoming calls, etc., to the mobile phone 20. In this manner, the mobile phone 20 and the computer 40 may be connected to each other via the portable handsfree 30 to transmit data between them.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention has been described above with reference to specific embodiments. However, other embodiments than those described are possible within the scope of the invention. For example, while the portable handsfree of embodiments the present invention has been discussed primarily to include a USB cable having a USB connector, it should be appreciated that other computer interfaces could be equally possible, e.g. a FireWire cable having a FireWire connector. Further, it appears to be possible to use other interfaces as well in the future, e.g. it appears to be possible to utilize an optical cable instead of a USB cable or FireWire cable. Yet further, while the portable handsfree of embodiments the present invention has been discussed primarily to include the USB connector within the microphone portion of the portable handsfree, it should be appreciated that the USB connector could equally possible be incorporated within another casing, e.g. a casing especially designed for encasing the USB connector. The above-described embodiments should be regarded as illustrative rather than restrictive, and it should be appreciated that variations may be made in those embodiments by persons skilled in the art without departing from the scope of the present invention as defined by the appended claims.

What is claimed is:

1. A portable handsfree device for cable-connection to a mobile terminal, the portable handsfree device comprising:
   a cable for connecting the portable handsfree device to a mobile terminal at a first end of the portable handsfree device and to a computer at another end of the portable handsfree device such that data transmission between the mobile terminal and the computer can be enabled through said portable handsfree device,
   wherein the cable is a USB cable comprising a USB connector for connection to a USB socket on the computer, and
   a handsfree cable comprising:
      at one end of the handsfree cable a connector for connecting the portable handsfree device to the mobile terminal,
      at an opposite end of the handsfree cable a speaker,
      a casing positioned in-between the connector and the speaker,
   wherein the handsfree cable comprises the USB cable within the handsfree cable and wherein the USB connector is provided within the casing, and
      a first cable portion comprising at one end the connector for connecting the portable handsfree device to the mobile terminal and at an opposite end a first casing portion; a second cable portion comprising at one end the speaker and at an opposite end a second casing portion; wherein the first and second casing portions are detachably arranged to each other in a male-female connection to form the casing and a third case portion connected to the first casing portion and at an opposite end a second speaker; and wherein
      the USB cable is incorporated within the first cable portion and the USB connector is incorporated within the first casing portion.

2. The portable handsfree device according to claim 1, wherein the casing comprises a microphone of the portable handsfree device.

3. The portable handsfree device according to claim 1, wherein the portable handsfree device is a stereo headset.

4. The portable handsfree device according to claim 1, wherein the portable handsfree device is connectable to said mobile terminal and wherein the mobile terminal is a mobile terminal from the group comprising: a portable radio communication equipment, a mobile radio terminal, a mobile telephone, a cellular telephone, a pager, a communicator, an electronic organizer, a smart phone, a media player or a music player.

5. A portable handsfree device for cable-connection to a mobile terminal, the portable handsfree device comprising:
   a cable for connecting the portable handsfree device to a mobile terminal at a first end of the portable handsfree device and to a computer at another end of the portable handsfree device such that data transmission between the mobile terminal and the computer can be enabled through said portable handsfree device,
   wherein the cable is a FireWire cable comprising a FireWire connector for connection to a FireWire socket on the computer, and
   a handsfree cable comprising:
      at one end of the handsfree cable a connector for connecting the portable handsfree to the mobile terminal,
      at an opposite end of the handsfree cable a speaker, and
      a casing positioned in-between the connector and the speaker, wherein the handsfree cable comprises the FireWire cable within the handsfree cable and wherein the FireWire connector is provided within the casing, and
      a first cable portion comprising at one end the connector for connecting the portable handsfree device to the mobile terminal and at an opposite end a first casing portion, a second cable portion comprising at one end the speaker and at an opposite end a second casing portion; wherein the first and second casing portions are detachably arranged to each other in a male-female connection to form the casing, and a third case portion connected to the first casing portion and at an opposite end a second speaker, and wherein
      the FireWire cable is incorporated within the first cable portion and the FireWire connector is incorporated within the first casing portion.

6. The portable handsfree device according to claim 5, wherein the casing comprises a microphone of the portable handsfree device.

7. The portable handsfree device according to claim 6, wherein the portable handsfree device is a stereo headset.

8. The portable handsfree device according to claim 5, wherein the portable handsfree device is connectable to said mobile terminal and wherein the mobile terminal is a mobile terminal from the group comprising: a portable radio communication equipment, a mobile radio terminal, a mobile telephone, a cellular telephone, a pager, a communicator, an electronic organizer, a smart phone, a media player or a music player.

* * * * *